United States Patent
Zitzelsberger

(10) Patent No.: US 6,290,308 B1
(45) Date of Patent: Sep. 18, 2001

(54) PUMP ASSEMBLY FOR USE IN A BRAKE SYSTEM OF A VEHICLE

(75) Inventor: Ralf Zitzelsberger, Marktoberdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/457,685

(22) Filed: Dec. 9, 1999

(30) Foreign Application Priority Data

Dec. 10, 1998 (DE) .............................................. 198 56 917

(51) Int. Cl.⁷ ....................................................... B60T 8/40
(52) U.S. Cl. ........................................ 303/116.4; 417/418
(58) Field of Search ................................. 303/116.4, 10; 417/418, 416, 415, 417, 40.1

(56) References Cited

U.S. PATENT DOCUMENTS

| | | | |
|---|---|---|---|
| 2,690,128 | * | 9/1954 | Basilewsky ........................ 417/418 X |
| 3,134,938 | * | 5/1964 | Morgan .............................. 417/418 X |
| 3,791,770 | * | 2/1974 | Farkos ................................... 417/418 |
| 3,884,125 | * | 5/1975 | Massie ............................... 417/418 X |
| 4,272,226 | * | 6/1981 | Osborne ................................ 417/418 |
| 4,421,464 | * | 12/1983 | Schmidt et al. ................... 417/418 X |
| 4,692,673 | | 9/1987 | DeLong . |
| 5,713,728 | * | 2/1998 | Salamey ................................ 417/418 |

FOREIGN PATENT DOCUMENTS

| | | |
|---|---|---|
| 1 655 383 | 2/1974 | (DE) . |
| 40 20 450 A1 | 1/1992 | (DE) . |
| 41 29 018 A1 | 3/1993 | (DE) . |
| 1 95 25 097 A1 | 1/1996 | (DE) . |
| 1 97 07 654 A1 | 8/1998 | (DE) . |
| 0605903 A1 | 12/1993 | (EP) . |
| 2125223 A | 8/1982 | (GB) . |
| 2209628 A | 9/1988 | (GB) . |
| 2266923 A | 5/1992 | (GB) . |
| WO 97/30288 | 1/1997 | (WO) . |

\* cited by examiner

Primary Examiner—R Oberleitner
Assistant Examiner—Melanie Torres
(74) Attorney, Agent, or Firm—Ronald E. Greigg; Edwin E. Greigg

(57) ABSTRACT

The invention relates to a pump assembly for pumping brake fluid into a hydraulic slip-controlled vehicle brake system. To achieve a simple, compact construction of the pump assembly, the invention proposes embodying the pump assembly with an electromagnet which has a permanent magnet and is driven into an oscillating motion by being supplied with an alternating voltage; a moving part of the electromagnet is solidly connected to a tappet, both of whose ends form pistons of two piston pumps.

16 Claims, 1 Drawing Sheet

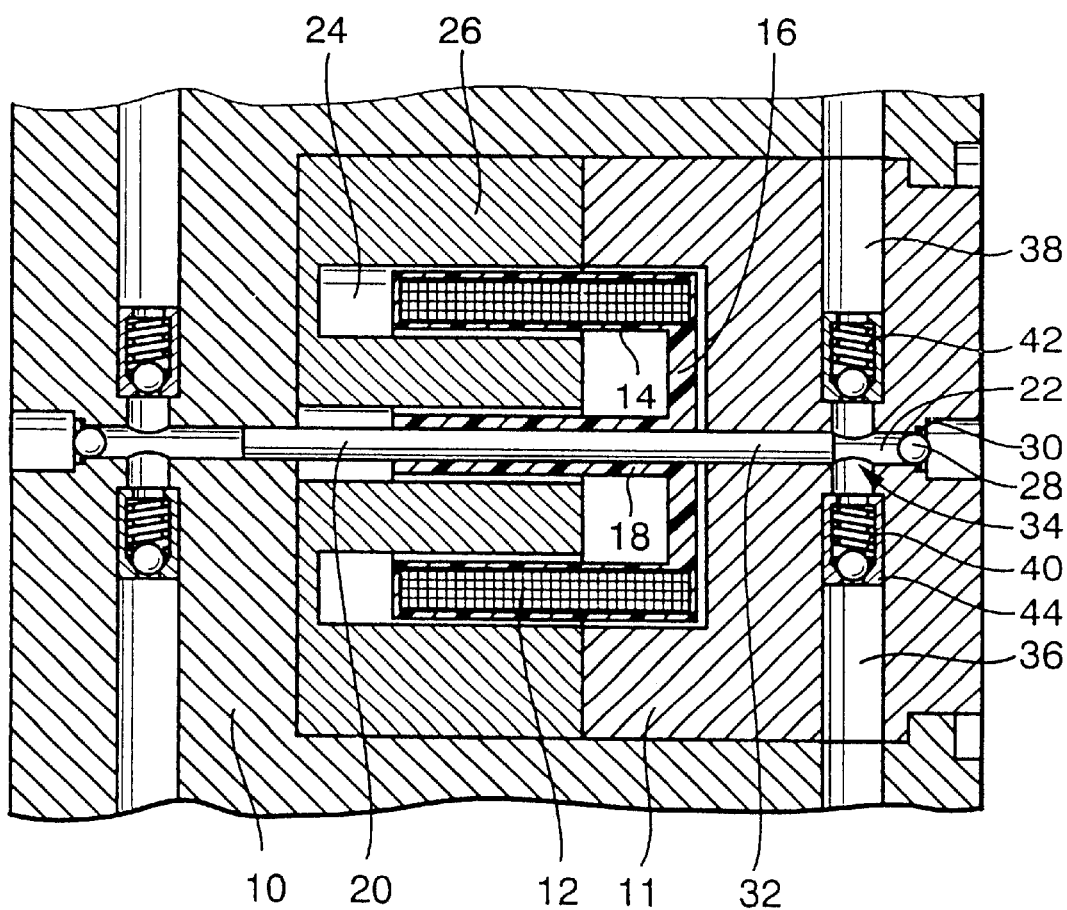

PUMP ASSEMBLY FOR USE IN A BRAKE SYSTEM OF A VEHICLE

BACKGROUND OF THE INVENTION

The invention relates to a pump assembly for use in a brake system of a vehicle. The pump assembly is intended in particular for use in a hydraulic brake system of a vehicle, where the pump assembly serves the purpose of brake pressure modulation in wheel brake cylinders during slip control or for brake pressure buildup in an electrohydraulic power brake system.

Such pump assemblies today typically have two piston pumps, each with one piston that is received axially displaceably in a cylinder. The two piston pumps are disposed coaxially (boxer arrangement) with the pistons facing one another. Located between the pistons is an eccentric element, which is mounted in a manner fixed against relative rotation on a shaft of an electric motor that is disposed perpendicular to the piston pumps. When the electric motor is turned on, the eccentric element drives the two pistons to execute a reciprocating stroke motion in the cylinders, and this motion brings about the feeding of brake fluid in a manner known per se.

The known pump assemblies have the disadvantage that they are complicated in structure and complex to install and are expensive. Because of the electric motor, the known pump assemblies are large. The electric motor is the dominant member of known hydraulic control circuits, housed in a hydraulic block, of anti-lock brake systems. In addition, the rotary motion of the electric motor has to be converted into a linear reciprocating motion of the pistons of the piston pumps, which involves major shear forces and friction losses, which impair efficiency and cause wear. Yet another factor is a high startup current of the electric motor and a pumping output of piston pumps that does not begin until the engine rpm is increasing. Still another disadvantage of the known pump assemblies is the noise they produce, and with the electric motor a pressure limitation is not possible, so that in the event of a malfunction, very high pressures can occur in the piston pumps, with the attendant risk that the pump assembly will explode.

OBJECT AND SUMMARY OF THE INVENTION

The pump assembly according to the invention has no conventional electric motor; instead, it has an electromagnet with a permanent magnet and a coil. Either the permanent magnet or the coil is stationary, while the respective other part is movable. Supplying current to the coil moves the moving part of the electromagnet in one direction, while supplying current of reverse polarity moves the moving part in the opposite direction relative to the stationary part. By applying an alternating voltage to the coil, the moving part of the electromagnet is driven to execute a reciprocating stroke motion. A voltage course of the current for supplying current to the coil can be in sine-wave or square-wave form, for example.

The piston of the piston pump of the pump assembly of the invention is connected to the moving part of the electromagnet and accordingly goes along with the reciprocating motion of the moving part of the electromagnet; as a result, in a manner known per se, the piston pump pumps brake fluid, or some other medium to be pumped. The electromagnet of the pump assembly of the invention accordingly forms a linear motor, with a permanent magnet whose moving part is driven into a reciprocating stroke motion by supplying alternating current to the coil; this motion is used directly, and without further conversion or deflection, for driving the piston. Instead of the piston, the cylinder of the piston pump may be movable while the piston itself is stationary. In that case, the cylinder of the piston pump is connected to the movable part the electromagnet and executes the reciprocating stroke motion.

The invention has the advantage that the pump assembly is simple in construction, has only a few parts, and can be put together at little effort or expense. The pump assembly has intrinsically only one moving part, namely the moving part of the electromagnet, and the piston that moves along with this part; the piston and the moving part of the electromagnet are preferably solidly joined to one another. The piston may for instance be embodied integrally, as a peg protruding from the moving part of the electromagnet. Because the reciprocating motion of the electromagnet is utilized directly to drive the piston pump without conversion or deflection, the pump assembly has good efficiency. Other advantages are low friction, low wear, and little noise. The pump assembly of the invention has a low current consumption of approximately one fourth the rated current consumption of the conventional pump assembly of the same capacity that is driven by an electric motor. Furthermore, the startup current of the pump assembly of the invention is not elevated, and the pump assembly of the invention has its full pumping capacity immediately after being turned on.

The permanent magnet of the electromagnet makes it possible to drive the moving part of the electromagnet by reversing the polarity of the current supplied to the coil in both directions; as a result, a restoration of the moving part go of the electromagnet, for instance by means of a restoring spring, becomes unnecessary. As a result, not only is the restoring spring dispensed with, but the electromagnet also need not work counter to the force of such a restoring spring; this reduces the structural size of the electromagnet and lessens its current consumption.

Advantageous features and refinements of the invention defined herein are the subject matter set forth hereinafter.

The pump assembly of the invention may have only a single piston pump. Preferably, the pump assembly has two piston pumps that are driven contrary to one another; that is, one piston pump executes an intake stroke while the other piston pump is executing a pumping stroke. The contrary disposition of the two piston pumps means that the force of the electromagnet is utilized uniformly in both directions. The use of two piston pumps has the advantage that the pump assembly of the invention is especially readily applicable to a dual-circuit brake system that has two independent brake circuits.

In a feature of the invention defined herein, the coil is embodied as a plunger coil. This means that over a portion of its length, the coil protrudes (plunges) into a complimentary recess of the permanent magnet, or of a pole piece that is magnetized by the permanent magnet. A plunging depth, that is, the length by which the coil protrudes into the permanent magnet, varies along with the reciprocating motion of the coil rpm; in a terminal position of the coil or permanent magnet, it can be zero, or the coil can have risen fully out of the permanent magnet. Embodying the coil as a plunger coil has the advantage that a magnetic force exerted on the moving part of the electromagnet is increased, for a particular current consumption of the coil. In addition, the magnetic force exerted on the moving part of the electromagnet is somewhat constant over the entire stroke course, unless the coil has moved completely out of the permanent magnet or the pole piece magnetized by the permanent magnet, while conversely in a conventional embodiment of the coil, the magnetic force drops off sharply with the distance from the permanent magnet. In the context of the invention, for the sake of uniform terminology, the term "plunger coil" should also be understood to mean a stationary coil that protrudes into a movable permanent magnet or a movable pole piece, even if in that case the term plunging armature would actually be more apt.

The pump assembly of the invention is intended in particular as a pump in a brake system of a vehicle and is used to control the pressure in wheel brake cylinders. Depending on the type of brake system, the abbreviations ABS (for anti-lock brake system), TCS (traction control system), ESP (electronic stability program) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or ESP or EHB). In a brake system with wheel slip control (ABS or TCS) and/or a brake system serving as a steering aid (ESP) and/or an electrohydraulic brake system (EHB), the pump is needed. With the wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (ESP), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The invention will be better understood and further objects and advantages thereof will become more apparent from the ensuing detailed description of a preferred embodiment taken in conjunction with the drawing.

BRIEF DESCRIPTION OF THE DRAWING

The sole drawing FIGURE shows a partical pump assembly of the invention in axial section.

DESCRIPTION OF THE PREFERRED EMBODIMENT

The pump assembly of the invention is inserted into a pump housing 10, which is closed by a housing cap 11 held in place by calking. The pump housing 10 is a component of a hydraulic block, of which only a fraction surrounding the pump assembly has been shown in the drawing, for the sake of clarity. The hydraulic block is part of a slip control device, not otherwise shown, of a hydraulic vehicle brake system. Besides the pump assembly, other hydraulic components, such as magnet valves, hydraulic reservoirs and damper chambers, not shown, are inserted into the hydraulic block and hydraulically interconnected. The hydraulic block is connected to a master cylinder, not shown, which is actuated by means of a brake pedal, and wheel brake cylinders, also not shown, are connected to the hydraulic block. The hydraulic block, with the hydraulic components inserted into the hydraulic block, forms the hydraulic portion of the slip control device of the hydraulic brake system of a vehicle.

The pump assembly has a coil 12, which is wound onto a hollow-cylindrical coil carrier 14. The coil 12 will hereinafter be called the plunger coil. On one face end, the coil carrier 14 has a disk-like support flange 16, which is disposed in a radial plane and connects the coil carrier 14 with a hub 18. The coil carrier 14 is integral with the support flange 16 and the hub 18; the coil carrier 14, support flange 16 and hub 18 are produced integrally in the form of a single plastic part 14, 16, 18. With the hub 18, the coil carrier 14 is press-fitted onto a tappet 20, both of whose ends protrude out of the coil carrier 14 and into a bore 22 that penetrates the pump housing 10 and the housing cap 11, so that the tappet 20 and together with it the plunger coil 12 are guided axially displaceably in the pump housing 10.

The plunger coil 12 protrudes, for approximately two-thirds of its length, into a complimentary recess 24 in a cylindrical permanent magnet 26, which is mounted in stationary fashion in the pump housing 10. The plunger coil 12 and the permanent magnet 26 form an electromagnet 12, 26.

The bore 22, in which the tappet 20 is received in axially displaceably guided fashion, is closed on both of its ends, at a distance from the face ends of the tappet 20, each with a respective ball 28 that is press-fitted into the bore 22 and is secured in the bore 22 by a respective calk 30. The two axially displaceably received ends of the tappet 20 in the bore 22 each form one piston 32 of two piston pumps 34; the cylinders of the piston pumps 34 are formed by the pump housing 10 provided with the bore 22 and by the housing cap 11. The tappet 20 thus at the same time forms the pistons 32 of the piston pumps 34, and the pistons 32 are integral with the tappet 20.

Between the ends of the tappet 20 that form the pistons 32 and the balls 28 that close the bore 22, the bore 22 is penetrated by a transverse bore 36, 38, which respectively form an inlet bore 36 and an outlet bore 38 of the piston pump 34. One inlet valve 40 is inserted into each inlet bore 36, and one outlet valve 42 is inserted into each outlet bore 38. The inlet valves 40 and outlet valves 42 are embodied as spring-loaded check valves, which are each accommodated in a respective cylindrical valve housing 44 that is press-fitted into the inlet bore 36 and outlet bore 38 as applicable. The inlet valves 40, embodied as check valves, allow a fluid flow through them in the direction of the bore 22, and the outlet valves 42, also embodied as check valves, allow a flow out of the bore 22.

The function of the pump housing of the invention, shown in the drawing, is as follows: For operation, the plunger coil 12 is supplied with an alternating voltage. As a result, in alternation at the frequency of the alternating voltage, it is moved deeper into the recess 24 of the permanent magnet 26 and back out again by some distance; that is, by application of the alternating voltage, the plunger coil 12 executes an oscillating, reciprocating motion. The tappet 20 solidly joined to the coil carrier 14 executes this oscillating reciprocating motion along with the plunger coil 12. This oscillating, reciprocating motion of the tappet 20 represents a reciprocating motion of the pistons 32 that are formed by the ends of the tappet 20. The reciprocating stroke motion of the pistons 32 leads to an alternating increase and decrease in the volume of the bore 22 between the pistons 32 and the balls 28 that close the bore 22; while this volume is being increased, brake fluid is aspirated through the inlet valves 40 into the bore 22, and while this volume is being decreased the aspirated brake fluid is positively displaced out of the bore 22 through the outlet valves 42. The two piston pumps 34 operate contrary to one another; that is, while one piston pump 34 is aspirating brake fluid, the other piston pump 34 is expelling brake fluid.

In a modification of the exemplary embodiment shown, the permanent magnet 26, instead of the plunger coil 12, can be solidly joined to the tappet 20, while the plunger coil 12 can be mounted in stationary fashion (not shown) in the pump housing 10. This does not change the function of the pump assembly. The diameter of the bore 22 in the pump assembly shown in the drawing is in the millimeter range; in the exemplary embodiment shown, it is four millimeters. The frequency and amplitude of the alternating voltage applied to the plunger coil 12 are preferably selected such that the coil carrier 14 does not strike the pump housing 10, and thus unnecessary noise is prevented.

The foregoing relates to a preferred exemplary embodiment of the invention, it being understood that other variants and embodiments thereof are possible within the spirit and scope of the invention, the latter being defined by the appended claims.

I claim:

1. A pump assembly for a vehicle brake system comprising a hydraulic block (10) with a recess which is closed by a housing cap (11), the pump assembly being inserted into the recess and including a first piston pump and a second piston pump, each of the first and second piston pumps having a piston and a cylinder that are axially displaceable relative to one another, one of the pistons being movably supported by the hydraulic block, the other being movably supported by the housing cap, the pump assembly having an electromagnet with a permanent magnet (26) and a coil (12) that are movable relative to one another, the pistons being connected to one of the permanent magnet and the coil, wherein the pistons are driven thereby to perform a reciprocating motion in their respective cylinders as the electromagnet is actuated.

2. The pump assembly according to claim 1, in which the two piston pumps (34) are disposed one on each side of the electromagnet.

3. The pump assembly according to claim 1, in which the coil (12) is embodied as a plunger coil.

4. The pump assembly according to claim 1, in which one of the permanent magnet and coil is stationarily mounted in the recess, the other being movable with respect thereto, and the moving part of the electromagnet is solidly connected to the pistons of the piston pumps (34).

5. The pump assembly according to claim 4, in which the moving part of the electromagnet is mounted on a tappet (20), which forms the pistons of the piston pumps.

6. The pump assembly according to claim 1, wherein the hydraulic block and the housing cap both have bores (22) which are in alignment, and wherein the pistons are integral with each other and reciprocate within the bores (22), and the bores form the cylinders of the pumps.

7. The pump assembly according to claim 6, wherein the bores of the hydraulic block and the housing cap both communicate respectively with an inlet bore (36) and an outlet bore (38) in the hydraulic block and the housing cap.

8. The pump assembly according to claim 6, wherein the integral pistons form the support for the movable one of the permanent magnet and the coil.

9. A pump assembly for a vehicle brake system comprising a hydraulic block (10) with a recess which is closed by a housing cap (11), the pump assembly being inserted into the recess and including a first piston pump and a second piston pump, each of the first and second piston pumps having a piston and a cylinder that are axially displaceable relative to one another, one of the pistons being movably supported by the hydraulic block, the other being movably supported by the housing cap, the pump assembly having an electromagnet with a permanent magnet (26) and a coil (12), with one of the permanent magnet and coil being stationarily mounted in the recess, the other being movable with respect thereto and being driven by the coil as it is energized by an alternating voltage, the pistons being connected to the movable one of the permanent magnet and the coil (12, 26), wherein the pistons are driven thereby to perform a reciprocating motion in their respective cylinders as the electromagnet is actuated.

10. The pump assembly according to claim 9, in which the two piston pumps (34) are disposed one on each side of the electromagnet.

11. The pump assembly according to claim 9, in which the coil (12) is embodied as a plunger coil.

12. The pump assembly according to claim 9, in which one of the permanent magnet and coil is stationarily mounted in the recess, the other being movable with respect thereto, and the moving part of the electromagnet is solidly connected to the pistons of the piston pumps (34).

13. The pump assembly according to claim 12, in which the moving part of the electromagnet is mounted on a tappet (20), which forms the pistons of the piston pumps.

14. The pump assembly according to claim 9, wherein the hydraulic block and the housing cap both have bores (22) which are in alignment, and wherein the pistons are integral with each other and reciprocate within the bores (22), and the bores form the cylinders of the pumps.

15. The pump assembly according to claim 14, wherein the bores of the hydraulic block and the housing cap both communicate respectively with an inlet bore (36) and an outlet bore (38) in the hydraulic block and the housing cap.

16. The pump assembly according to claim 14, wherein the integral pistons form the support for the movable one of the permanent magnet and the coil.

* * * * *